(12) United States Patent  
Chung et al.

(10) Patent No.: US 8,179,494 B2  
(45) Date of Patent: May 15, 2012

(54) LIQUID CRYSTAL DISPLAY AND SUBSTRATE THEREOF

(75) Inventors: Te-Chen Chung, Kun Shan (CN); Tean-Sen Jen, Kun Shan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 945 days.

(21) Appl. No.: 12/174,648

(22) Filed: Jul. 17, 2008

(65) Prior Publication Data

US 2009/0033822 A1 Feb. 5, 2009

(30) Foreign Application Priority Data

Jul. 31, 2007 (CN) .......................... 2007 1 0137673

(51) Int. Cl.
*G02F 1/1333* (2006.01)
*G02F 1/1343* (2006.01)
*G02F 1/13* (2006.01)

(52) U.S. Cl. .............................. 349/54; 349/55; 349/192

(58) Field of Classification Search ................ 349/54–55
See application file for complete search history.

(56) References Cited

U.S. PATENT DOCUMENTS

| 5,532,853 | A | * | 7/1996 | Song et al. ..................... 349/149 |
| 6,111,558 | A | | 8/2000 | Jeung et al. |
| 7,492,438 | B2 | * | 2/2009 | Lin et al. ....................... 349/192 |
| 7,936,410 | B2 | * | 5/2011 | Oh et al. ......................... 349/54 |
| 2007/0040794 | A1 | | 2/2007 | Kwak et al. |

FOREIGN PATENT DOCUMENTS

CN 2007101376731 A 4/2008

\* cited by examiner

*Primary Examiner* — Wen-Ying P Chen
(74) *Attorney, Agent, or Firm* — Perkins Coie LLP; Aaron Wininger

(57) ABSTRACT

A liquid crystal display having a repair line structure and an array substrate of the liquid crystal display are provided. The repair line comprises a front repair line portion arranged to at least partially overlap a front portion of a first signal line, an end repair line portion arranged to at least partially overlap an end portion of the first signal line, and an intermediate repair line portion electrically connecting the front and end repair line portions. The front repair line portion comprises at least a first signal connection line and an external line which are electrically isolated when the repair line has not been used to repair a defect in the first signal line.

11 Claims, 7 Drawing Sheets

LIQUID CRYSTAL DISPLAY AND SUBSTRATE THEREOF

TECHNICAL FIELD

The present invention relates to a liquid crystal display (LCD) and an array substrates thereof, and in particular to a liquid crystal display having a repair line structure.

BACKGROUND

Liquid crystal displays (LCDs) are advantageous in being light, thin and having low power consumption. LCDs have been widely used in modern information devices such as notebook computers, mobile phones, and personal digital assistants (PDAs).

FIG. 1 shows an array substrate of a conventional liquid crystal display. The LCD array substrate 110 comprises a signal introducing region 111 and a display region 112. Data line pads 121 and scanning line pads 131 are formed in the signal introducing region 111. A plurality of data lines 122 and scanning lines 132 are respectively connected to the data line pads 121 and the scanning line pads 131. A plurality of pixels P is defined in an region where the data lines and the scanning lines cross. A data signal and a scanning signal are externally inputted via the data line pads 121 and the scanning line pads 131, and then transmitted to the respective pixels P in the display region 112 through the data lines 122 and the scanning lines 132.

In processes of manufacturing conventional LCD array substrates, defects such as break and the like may occur in the data lines. As shown in FIG. 1, the data line 122 is broken at a point D1 in the display region 112. In this case, a data signal cannot be transmitted to the data line below the break D1, thereby causing a so-called line defect.

In order to repair the line defect in the array substrate, U.S. Pat. No. 6,111,558 discloses a repair structure. In the structure, as shown in FIG. 2 of the present application, a data line 122 comprises three portions, that is, a front data line portion 122a outside the display region and connected with a data line pad 121, a display region data line portion 122b, and an end data line portion 122c outside the display region and at the side away from the data line pad 121. In addition, a repair line 223 is provided outside the display region 112 of the liquid crystal display. In the plan view of the array substrate of FIG. 2, the repair line 223 crosses with the front data line portion 122a and the end data line portion 122c perpendicularly. However, in a direction perpendicular to the surface of the array substrate, the repair line 223 and the data line 122 are positioned in different layers and separated by an insulating layer therebetween. Hence the repair line 223 and the data line 122 are normally not in an electrical connection.

When a break point D2 occurs as shown in FIG. 2, the front data line portion 122a and the repair line 223 are electrically connected at the crossing point A, and the end data line portion 122c and the repair line 223 are electrically connected at the crossing point B by laser melting. Thus, a data signal on the data line can be transmitted to the repair line 223 via the crossing point A through the front data line portion 122a, and then via the point B to the data line below the break point D2. In this manner, the line defect is repaired.

However, there are some disadvantages in the above repair structure. First, the material of the repair line 223 formed on a glass substrate is typically the same with that of the scanning line, for example Mo and AlNd, resulting a relatively large resistance. Second, when the front data line portion 122a and the end data line portion 122c are electrically connected by laser melting to the repair line 223 at the points A and B respectively, a parasitic capacitance may come out between the repair line 223 and other data lines because of being positioned in a crossing manner. Therefore, a delay will occur when a data signal is transmitted along the repair line 223. Furthermore, the parasitic capacitance will also affect signal transmission in other data lines.

In order to solve the above problem, US Patent Application Publication No. 2007/0040794A1 discloses another repair line structure. As shown in FIG. 3, the repair line structure is composed of a front repair line portion 325, an end repair line portion 323 and an intermediate repair line portion 324. The front repair line portion 325 is positioned outside a display region 112 and arranged perpendicular to a front data line portion 122a of a data line 122. However, the front repair line portion 325 and the data line 122 are positioned in different layers and separated by an insulating layer, and are normally not electrically connected. The end repair line portion 323 is positioned outside the display region 112 and arranged perpendicular to an end data line portion 122c of the data line 122. Also, the end repair line portion 323 and the data line portion 122 are positioned in different layers and separated by an insulating layer, and are normally not electrically connected. The intermediate repair line portion 324 is connected with the front repair line portion 325 and the end repair line portion 323 respectively. The intermediate repair line portion 324 can be formed on a printed circuit board (PCB) 340 and thus a material having high electric conductivity such as copper can be used. As a result, the resistance of the repair line is reduced.

When a break D3 occurs as shown in FIG. 3, the front data line portion 122a and the front repair line portion 325 are electrically connected at the crossing point A', and the end data line portion 122c and the end repair line portion 323 are connected at the crossing point B' by laser melting. Thus, a data signal on the front data line portion 122a can be transmitted to the intermediate repair line portion 324 on the PCB via the point A', the front repair line portion 325 and the data line pad 121, and then to the data line below the break D3 via the end repair line portion 323 and the point B'. In this manner, the line defect is repaired.

In this repairing structure, the intermediate repair line portion 324 acts as a common repair signal line, which is connected with the front repair line portions of a plurality of repair lines. Therefore, when a data signal is transmitted in the intermediate repair line portion 324, the front repair line portions of the plurality of repair lines that are respectively connected to the intermediate repair line portion 324 will form parasitic capacitances with the data lines crossing with them, which can affect signal transmission.

SUMMARY

In a first embodiment, an array substrate of a liquid crystal display is provided comprising a first signal line, a second signal line and a repair line. The first signal line comprises a front portion, a display region portion and an end portion. The second signal line is configured to cross with the first signal line. The repair line is positioned outside a display region of the array substrate, and comprises a front repair line portion, an end repair line portion and an intermediate repair line portion electrically connecting the front repair line portion and the end repair line portion. The end repair line portion comprises a portion which is electrically isolated from the end portion of the first signal line when the repair line has not been used to repair a defect in the first signal line and is electrically connected with the end portion of the first signal line when the repair line is used to repair the defect in the first signal line. In the array substrate, the front repair line portion comprises a first signal connection line and an external line. The first signal connection line is configured to be electrically isolated from the front portion of the first signal line when the repair line has not been used to repair the defect in the first signal line and to be electrically connected with the front portion of the first signal line when the repair line is used to repair the defect in the first signal line. The external line includes a portion of the front repair line that is electrically connected with the intermediate repair line portion, and the first signal connection line is electrically isolated from the external line when the repair line has not been used to repair the defect in the first signal line.

In a further embodiment, the intermediate repair line portion and the end repair line portion may at least each comprise a disconnection portion. With such configuration, repair can be carried out more effectively without consuming more space of the array substrate.

Embodiments of the invention further provide a liquid crystal display comprising an array substrate according to any of the above embodiments.

According to an embodiment of the invention, the repair line on an LCD array substrate can have the front repair line portion and the intermediate repair line portion separated. Therefore, when a repair signal is transmitted on the intermediate repair line portion, it is possible to prevent forming a parasitic capacitance between the front repair line portion and the data line, and to ensure a better signal transmission quality.

DETAILED DESCRIPTION OF THE INVENTION

Exemplary embodiments will be described in detail in the following with reference to the drawings.

Figure 1:
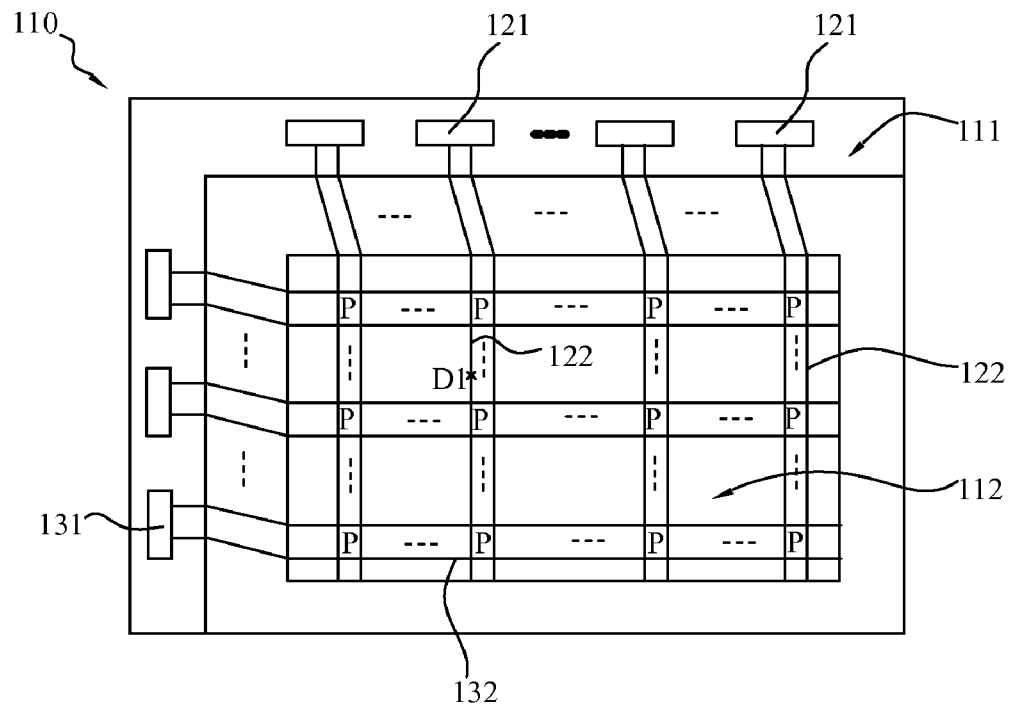
FIG. 1 is a view showing an array substrate of a conventional liquid crystal display.
Figure 2:
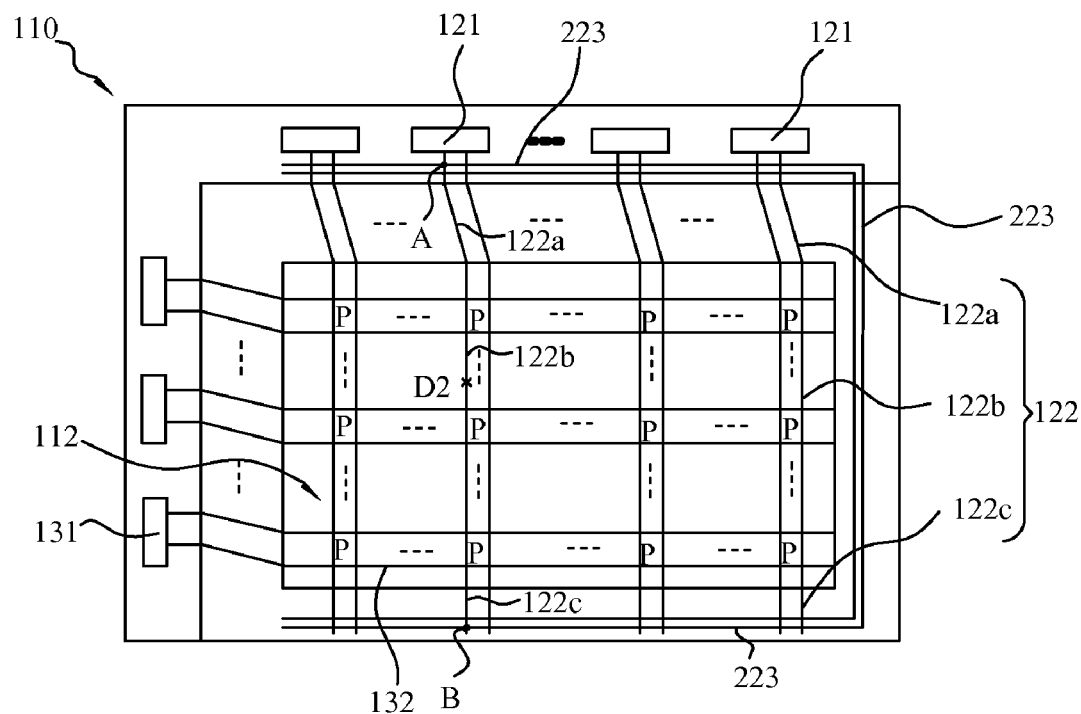
FIG. 2 is a view showing a conventional repair line structure.
Figure 3:
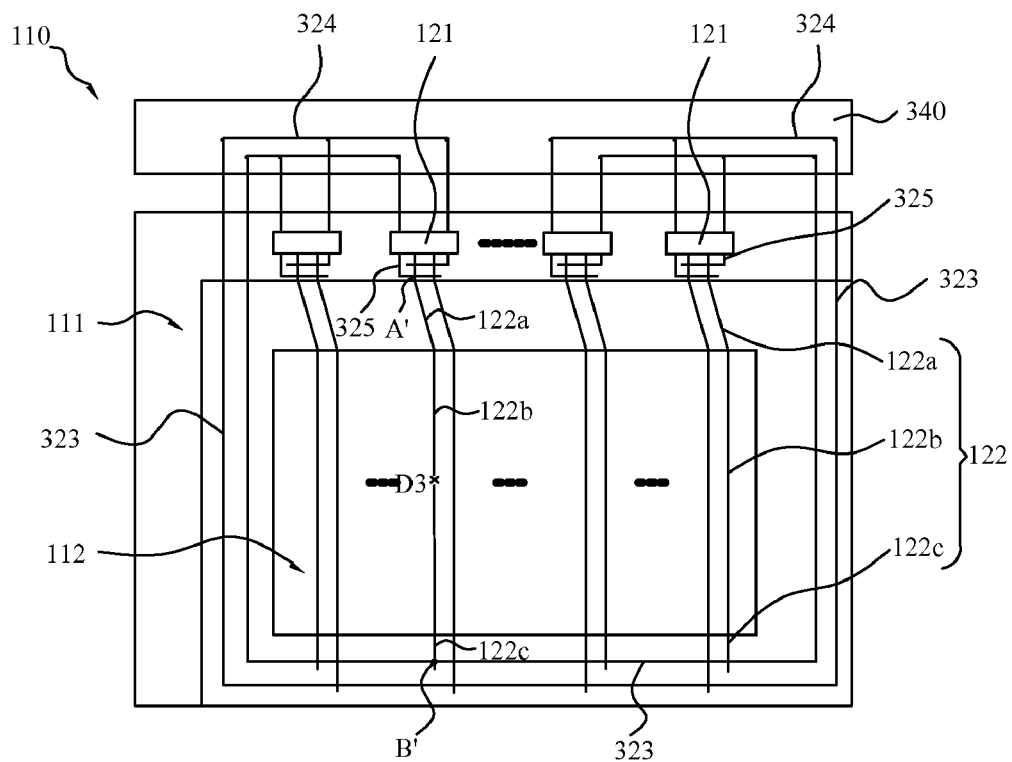
FIG. 3 is a view showing another conventional repair line structure.
Figure 4A:
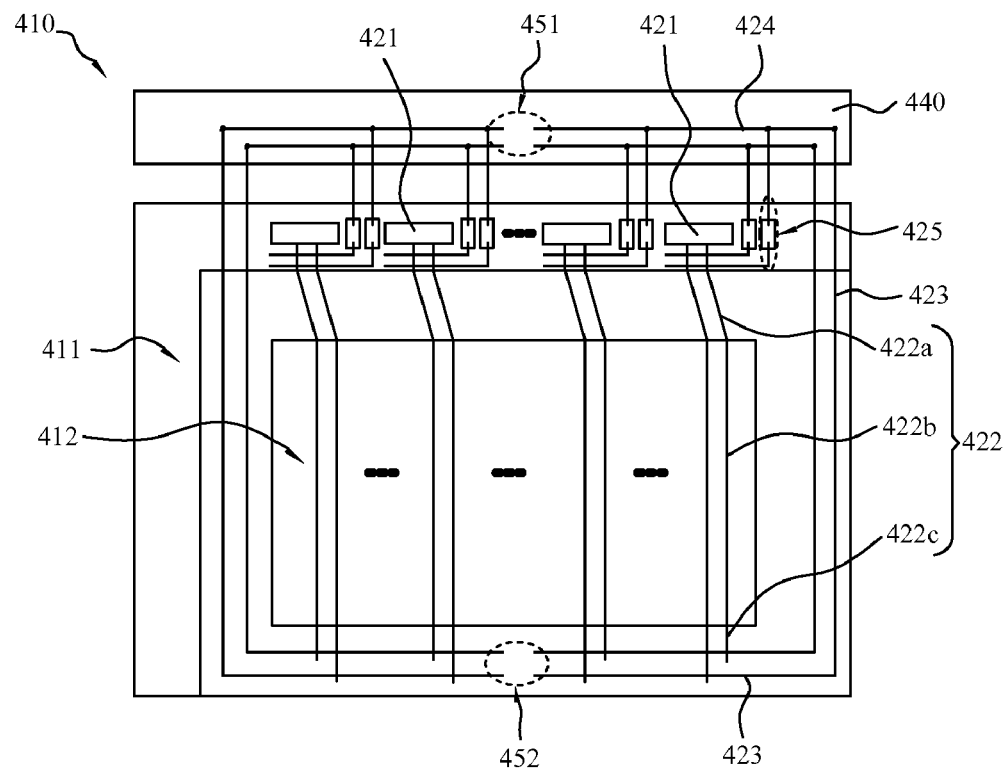
FIG. 4A is a plan view showing a repair line structure of an LCD array substrate in accordance with a first embodiment of the invention.

FIG. 4A is a plan view showing a repair line structure of an LCD array substrate in accordance with a first embodiment of the invention. An LCD array substrate 410 comprises a display region 412 and a signal introducing region 411. A plurality of data line pads 421 is formed in the signal introducing region 411 and electrically connected with corresponding data lines 422 respectively. Each of the data lines 422 comprises three portions, that is, a front data line portion 422a outside the display region 412 and electrically connected with a corresponding data line pad 421, a display region data line portion 422b in the display region 412, and an end data line portion 422c outside the display region 412 and at the side away from the data line pad 421. A data signal inputted from the data line pad 421 is transmitted on the whole data line 422 from the front data line portion 422a. For the sake of clarity, scanning lines, which are provided crossing with the data lines 422, are not shown in FIG. 4A.

The repair line in accordance with the invention may comprise a front repair line portion 425, an end repair line portion 423 and an intermediate repair line portion 424. The front repair line portion 425, the end repair line portion 423 and the intermediate repair line portion 424 may each comprise one or more conductive lines. The conductive lines for these repair line portions may be same or different in number.

The front repair line portion 425 is provided outside the display region 412. When viewed in a direction perpendicular to a surface of the array substrate (referred to as a "perpendicular direction" herein as appropriate), the front repair line portion 425 partially overlaps the front data line portion 422a. For example, the front repair line portion 425 may be arranged substantially perpendicular to the front data line portion 422a. However, in the direction perpendicular to the surface of the array substrate, the front repair line portion 425 and the data line 422 lie within different layers and are separated by an insulating layer therebetween, and hence are not in an electrical connection when the repair line has not been used for repairing a defect in the data line 422.

The end repair line portion 423 is also provided outside the display region 412 and partially overlaps the end data line portion 422c. For example, the end repair line portion 423 may be arranged substantially perpendicular to the end data line portion 422c. Also in the direction perpendicular to the surface of the array substrate, the end repair line portion 423 and the data line 422 lie within different layers and are separated by an insulating layer therebetween, and hence are not in an electrical connection when the repair line has not been used for repairing a defect in the data line 422.

The front repair line 425 and the end repair line 423 are electrically connected with the intermediate repair line 424 respectively. The intermediate repair line 424 may be formed on the array substrate. Alternatively, the intermediate repair line 424 may be formed on a separate printed circuit board (PCB) 450 in the LCD, and thus may be formed using a material having high electric conductivity such as copper, resulting a decreased resistance of the repair line.

Figure 4B:
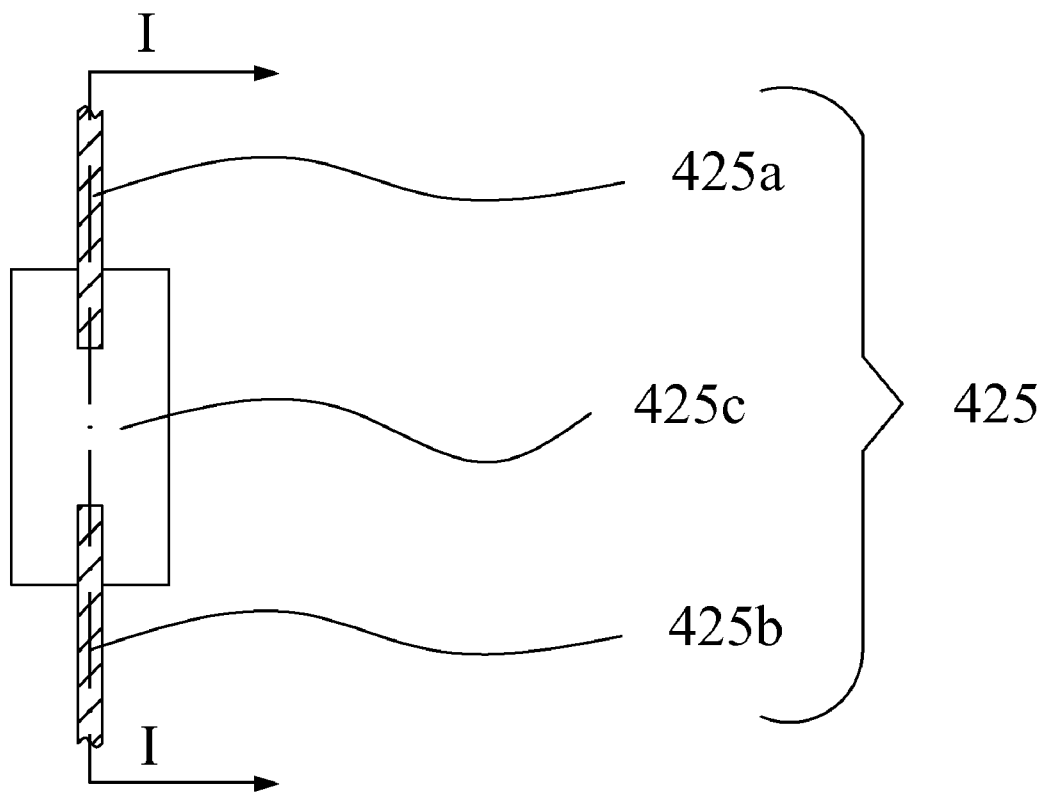
FIG. 4B shows a partially enlarged view of the front repair line portion in FIG. 4A.

FIG. 4B shows a partially enlarged view of the front repair line portion 425 in FIG. 4A. As shown in FIG. 4B, the front repair line portion 425 comprises an external line 425a, a data connection line 425b and a conductive connection portion 425c. The external line 425a is electrically connected with the intermediate repair line portion 424. When viewed along the direction perpendicular to the surface of the array substrate, the data connection line 425b at least partially overlaps the front data line portion 422a. For example, the data connection line 425b may be arranged substantially perpendicular to the front data line portion 422a. In addition, when viewed along the direction perpendicular to the surface of the array substrate, the external line 425a and the data connection line 425b partially overlap the connection portion 425c respectively.

Figure 4C:
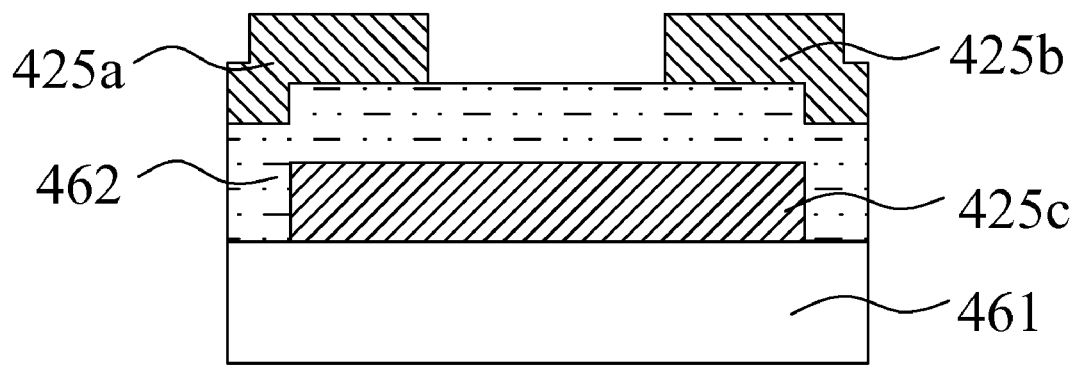
FIG. 4C is a sectional view of the front repair line portion along the I-I line of FIG. 4B.

FIG. 4C is a sectional view of the front repair line portion 425 along the I-I line of FIG. 4B. As shown in FIG. 4C, the connection portion 425c is formed on an array substrate 461 such as a glass substrate and covered by an insulating layer 462 thereon. The external line 425a and the data connection line 425b are formed on the insulating layer 462, and partially overlap the connection portion 425c in the perpendicular direction.

Figure 5:
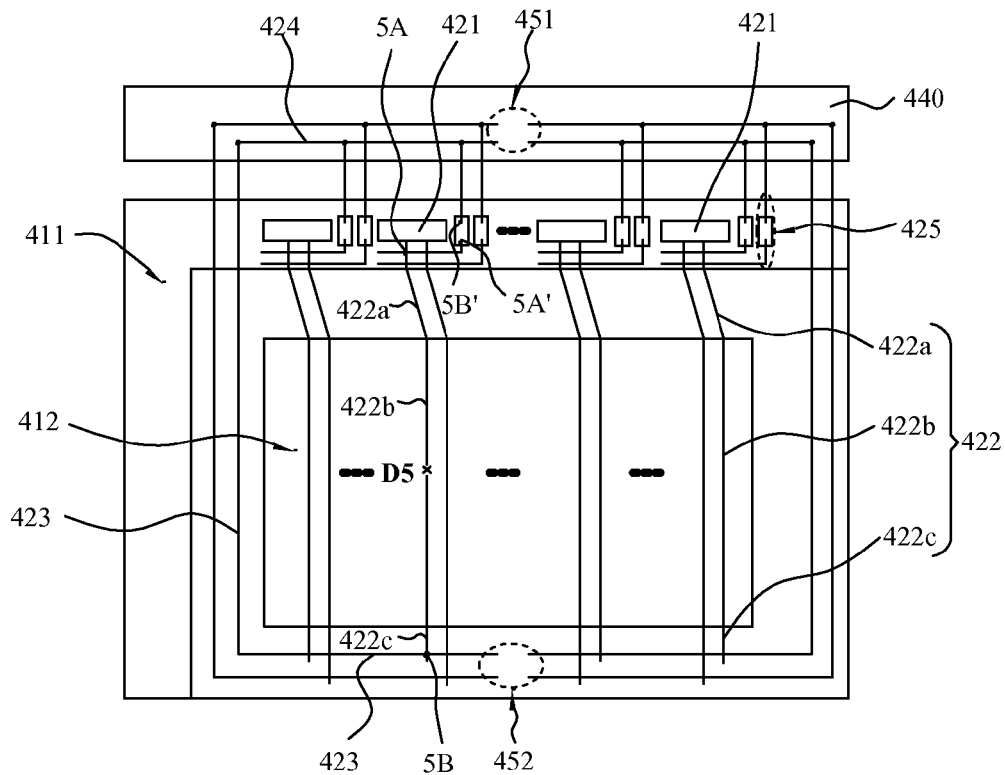
FIG. 5 is a schematic view showing the manner of repairing a line defect according to the first embodiment of the invention.

With the above described repair line structure, in case that a break, for example the break D5 shown in FIG. 5, occurs, the front data line portion 422a and the data connection line 425b are electrically connected at an overlapping region 5A, the data connection line 425b and the connection portion 425c are electrically connected at an overlapping region 5A', the external line 425a and the connection portion 425c are electrically connected at an overlapping region 5B', the end repair line portion 423 and the end data line portion 422c are electrically connected at an overlapping region 5B, by laser melting for example. As a result, a data signal on the front data line portion 422a can be transmitted to the intermediate repair line portion 424 on the PCB via the point 5A, the data connection line 425b, the point 5A', the connection portion 425c, the point 5B' and the external line 425a, and then to the data line below the break point D5 via the end repair line portion 423 and the point 5B, such that the defect in the data line is repaired.

In the present embodiment, after repair is carried out using the repair line, when a data signal is transmitted on the intermediate repair line portion 424, other front repair line portions are still electrically isolated from the intermediate repair line portion 424 by corresponding connection portions 425c. The front repair line portions hence will not form parasitic capacitances with the data lines crossing with them, resulting an improved signal transmission quality.

In the array substrates shown in FIG. 4A and FIG. 5, the intermediate repair line portion 424 is divided into two portions by a disconnection portion 451, and the end repair line portion 423 is divided into two portions by a disconnection portion 452. The repair line divided into two portions can be used to repair line defects located on the left and right sides of the shown liquid crystal display respectively, thereby the area of the array substrate can be used more effectively and the area on the array substrate for the repair line can be reduced.

The positional relation among the components of the front repair line portion 425 in FIG. 4C is only illustrative, and the repair line structure of the invention is not limited thereto. For example, the insulating layer may be one layer or a plurality of layers. The connection portion 425c may be formed with a metal material, or with other conductive materials, such as a transparent conductive material (for example Indium Tin Oxide (ITO) or the like), which is the same with that used for a pixel electrode. In the front repair line portion, the external line 425a and the data connection line 425b may be positioned in a single layer or in different layers as long as they are not electrically connected directly.

Figure 6A:
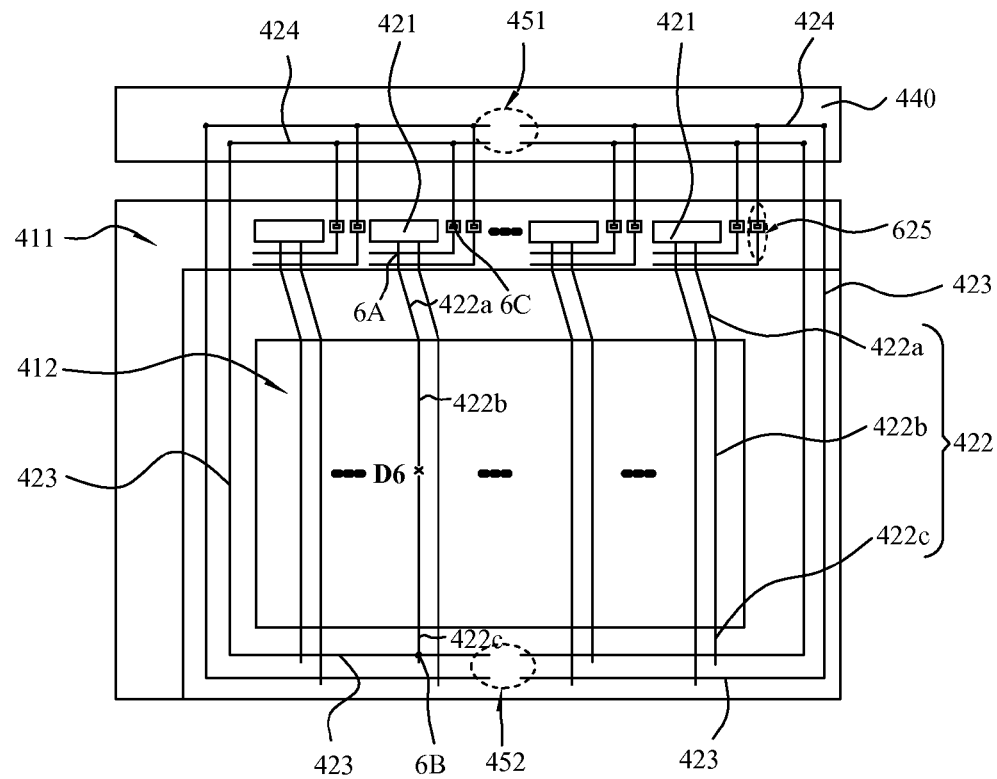
FIG. 6A shows a schematic view of a repair line structure of a liquid crystal display in accordance with a second embodiment of the invention.

FIG. 6A shows a schematic view of a repair line structure of a liquid crystal display in accordance with a second embodiment of the invention. The repair line comprises a front repair line portion 625, an end repair line portion 423 and an intermediate repair line portion 424. The positional relation of the end repair line portion 423 and the intermediate repair line portion 424 with other lines is similar to that in the first embodiment, and therefore will not be described again in detail.

Figure 6B:
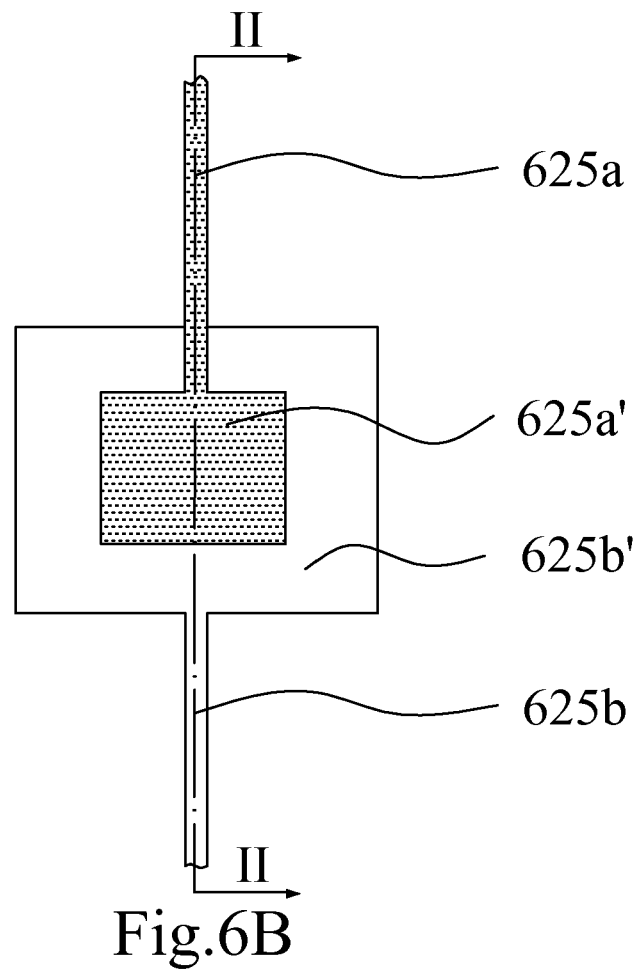
FIG. 6B shows a partially enlarged view of the front repair line portion in the second embodiment.

FIG. 6B shows a partially enlarged view of the front repair line portion 625 in the second embodiment. The front repair line portion 625 comprises an external line 625a and a data connection line 625b. The external line 625a has one end thereof electrically connected with the intermediate repair line portion 424 on for example a PCB in the LCD. When viewed along the perpendicular direction, the data connection line 625b partially overlaps the front data line portion 422a. For example, the data connection line 625b may be arranged substantially perpendicular to the front data line portion 422a. In addition, the front data line portion 422a and the data connection line 625b are positioned in different layers and separated by an insulating layer therebetween. Therefore, the front data line portion 422a and the data connection line 625b are not electrically connected with each other when the repair line has not been used to carry out repair to a defect in the data line 422, and are electrically connected with each other by for example laser melting when the repair is required.

In the front repair line portion 625 in accordance with the second embodiment, when viewed along the direction perpendicular to the surface of the array substrate, an end portion 625a' of the external line 625a and an end portion 625b' of the data connection line 625b are arranged at least partially overlapping. However, the external line 625a and the data connection line 625b are positioned in different layers in the perpendicular direction and separated by an insulating layer therebetween, hence are not electrically connected when the repair line has not been used to repair a defect in the data line 422.

Figure 6C:
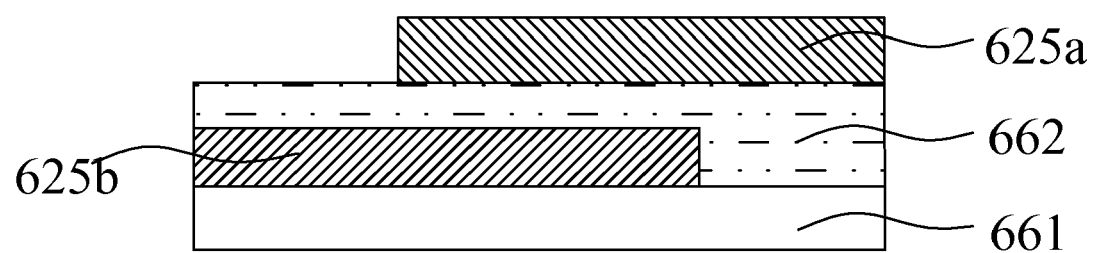
FIG. 6C is a sectional view of the front repair line portion along the II-II line in FIG. 6B.

FIG. 6C is a sectional view of the front repair line portion 625 along the II-II line in FIG. 6B. The data connection line 625b of the front repair line portion 625 is formed on an array substrate 661 such as a glass substrate and covered by an insulating layer 662 thereon. The external line 625a of the front repair line portion 625 is formed on the insulating layer 662. As shown in FIG. 6C, the external line 625a and the data connection line 625b overlap partially.

In case that a break, for example the break D6 shown in FIG. 6A, occurs, the front data line portion 422a and the data connection line 625b of the front repair line portion 625 are electrically connected at an overlapping region 6A, the end data line portion 422c and the end repair line portion 423 are electrically connected at an overlapping region 6B, and the data connection line 625b and the external line 625a are electrically connected at an overlapping region 6C, by laser melting for example. As a result, a data signal on the front data line portion 422a can be transmitted to the intermediate repair line portion 424 for example on a PCB via the point 6A, the data connection line 625b, the point 6C and the external line 625a, and then to the data line below the break point D6 via the end repair line portion 423 and the point 6B, such that the defect in the data line is repaired.

In the present embodiment, after repair is carried out using the repair line, when a data signal is transmitted on the intermediate repair line portion 424, other front repair line portions are still electrically isolated from the intermediate repair line portion 424 by the insulating layer 662 in the corresponding overlapping region 6C. The front repair line portions hence will not form parasitic capacitances with the data lines crossing with them, resulting an improved signal transmission quality.

The positional relation among the components of the front repair line portion 625 in FIG. 6C is only illustrative, and the repair line structure of the invention is not limited thereto. The positional relation between the data connection line 625b and the external 625a of the front repair line portion 625 may vary as appropriate provided that they are not electrically connected directly. The insulating layer between them may be one layer, or a plurality of layers, or a plurality of insulating layers having other conductive material sandwiched therebetween.

Figure 7A:
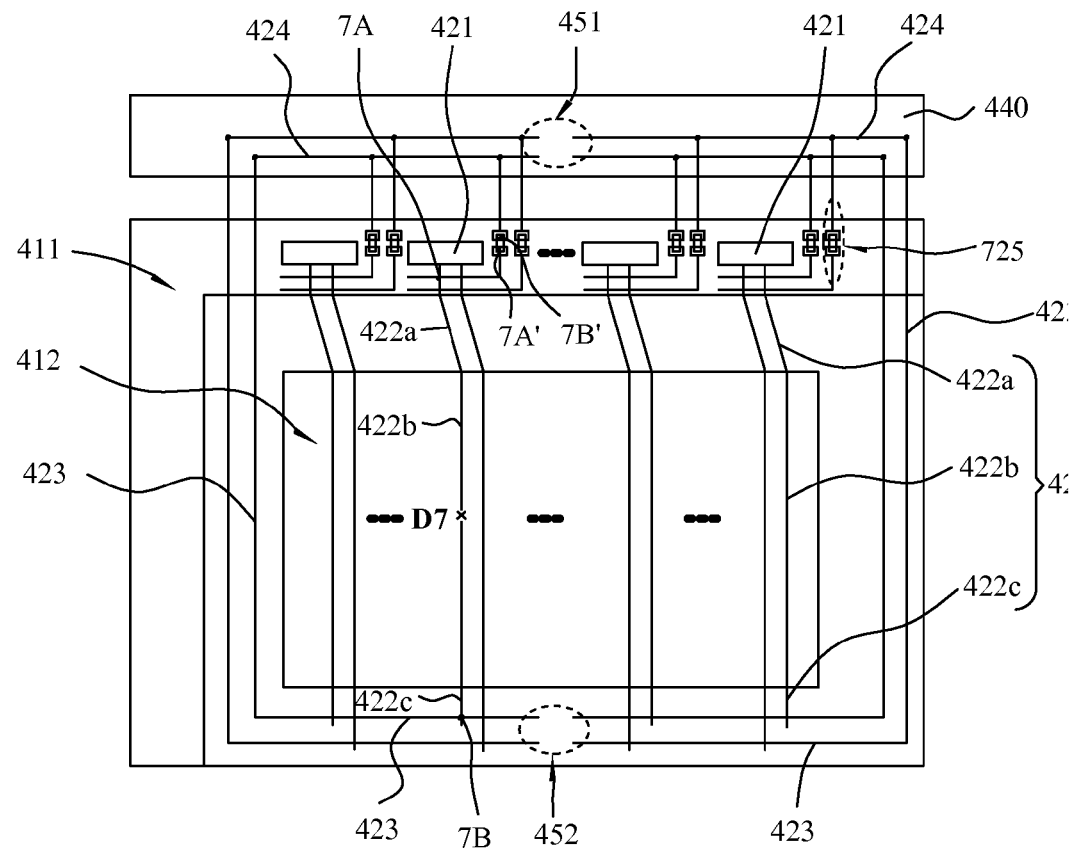
FIG. 7A shows a schematic view of a repair line structure of a liquid crystal display in accordance with a third embodiment of the invention.

FIG. 7A shows a schematic view of a repair line structure of a liquid crystal display in accordance with a third embodiment of the invention. The repair line comprises a front repair line portion 725, an end repair line portion 423 and an intermediate repair line portion 424. The positional relation of the end repair line portion 423 and the intermediate repair line portion 424 with other lines is similar to that in the first embodiment, and therefore will not be described again in detail.

Figure 7B:
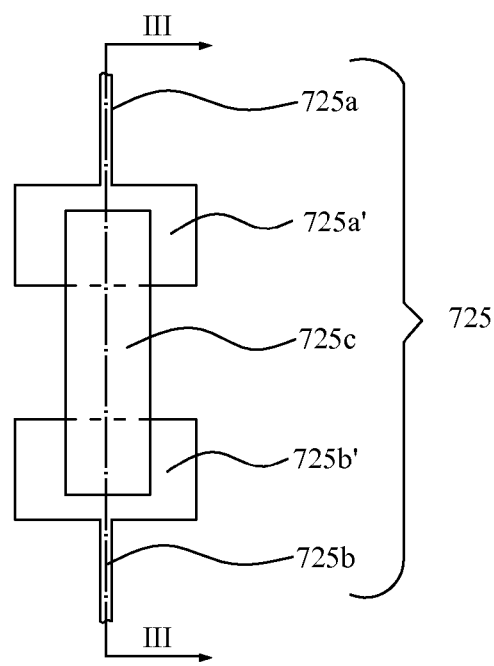
FIG. 7B shows a partially enlarged view of the front repair line portion in the third embodiment.

FIG. 7B shows a partially enlarged view of the front repair line portion 725 in the embodiment. The front repair line portion 725 comprises an external line 725a, a data connection line 725b and a conductive connection portion 725c. The external line 725a has one end thereof electrically connected with the intermediate repair line portion 424 on for example a PCB in the LCD. When viewed along the perpendicular direction, the data connection line 725b partially overlaps the front data line portion 422a. For example, the data connection line 725b may be arranged substantially perpendicular to the front data line portion 422a. In addition, the front data line portion 422a and the data connection line 725b are positioned in different layers and separated by an insulating layer therebetween. Therefore, the front data line portion 422a and the data connection line 725b are not electrically connected with each other when the repair line has not been used to carry out repair to a defect in the data line 422, and are electrically connected with each other by for example laser melting when the repair is required. When viewed along the direction perpendicular to the surface of the array substrate, the connection portion 725c of the front repair line portion overlaps an end portion 725a' of the external line and an end portion 725b' of the data connection line at least partially.

Figure 7C:
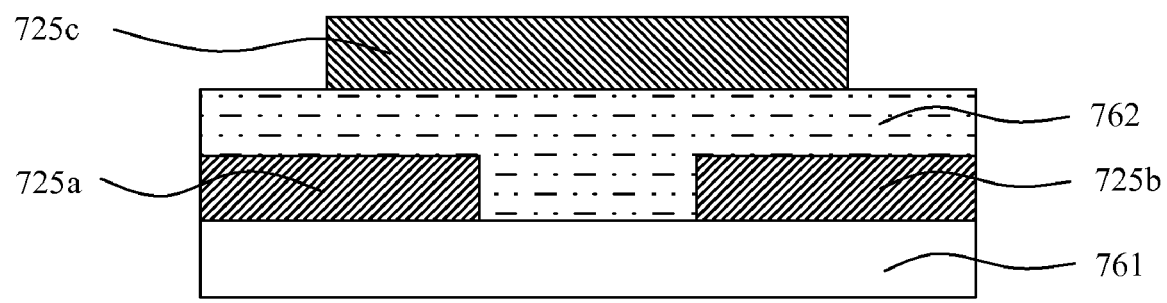
FIG. 7C is a sectional view of the front repair line portion along the III-III line in FIG. 7B.

FIG. 7C is a sectional view of the front repair line portion 725 along the III-III line in FIG. 7B. The external line 725a and the data connection line 725b of the front repair line portion 725 are formed on an array substrate 761 such as a glass substrate and covered by an insulating layer 762 thereon. The connection portion 725c is formed on the insulating layer 762. An end portion of the external line 725a and an end portion of the data connection line 725b partially overlap the connection portion 725c with an insulating layer 762 therebetween.

In case that a break, for example the break D7 shown in FIG. 7A, occurs, the front data line portion 422a and the data connection line 725b of the front repair line portion 725 are electrically connected at an overlapping region 7A, the end portion of the data connection line 725b and the connection portion 725c are electrically connected at an overlapping region 7A', the end portion of the external line 725a and the connection portion 725c are electrically connected at an overlapping region 7B', the end data line portion 422c and the end repair line portion 423 are electrically connected at an overlapping region 7B, by laser melting for example. As a result, a data signal on the front data line portion 422a can be transmitted to the intermediate repair line portion 424 on the PCB via the point 7A, the data connection line 725b, the point 7A', the connection portion 725c, the point 7B' and the external line 725a, and then to the data line below the break point D7 via the end repair line portion 423 and the point 7B, such that the defect in the data line is repaired.

In the present embodiment, when a data signal is transmitted on the intermediate repair line portion 424, other front repair line portions 725 connected to the intermediate repair line portion 424 are electrically isolated by the corresponding insulating layer. These front repair line portions 725 hence will not form parasitic capacitances with the data lines crossing with them, resulting an improved signal transmission quality.

The positional relation among the components of the front repair line portion 725 in FIG. 7C is only illustrative, and the repair line structure of the invention is not limited thereto. For example, the insulating layer 762 may be one layer or a plurality of layers. The connection portion 725c may be formed with a metal material, or with other conductive materials, such as a transparent conductive material (for example Indium Tin Oxide (ITO) or the like), which is the same with that used for a pixel electrode. In the front repair line portion, the external line 725a and the data connection line 725b may be positioned in a single layer or in different layers, or in layers that are upper and lower than the connection portion 725c, as long as they are not electrically connected directly.

The structure of the overlapping regions, connection portions and the like are only illustrative for describing the principle of the invention, and are not intended to limit the scope of the invention. For example, description herein is only made with reference to the examples in which the end repair line portion and the end data line portion partially overlap each other with an insulating layer therebetween, or the two portions partially overlap the conductive connection portion respectively. However, other manners of providing the end repair line portion and the end data line portion may occur to those skilled in the art, as long as the two portions are provided allowing the end repair line portion to be electrically isolated from the end data line portion when the repair line is not used to repair a defect in the data line and electrically connected with the end data line portion when the repair line is used to repair the defect. The data connection line of the front repair line portion and the front data line portion may also be provided in a similar manner.

In addition to repair a defect in a data line, the invention may be used to repair a defect in a scanning line. In this case, an embodiment for repairing a defect in a scanning line can be obtained by substituting the respective portions of a data line (that is, the front data line portion, the display region data line portion and the end data line portion) with corresponding portions of a scanning line (a front scanning line portion, a display region scanning line portion and an end scanning line portion) and substituting the data connection line of the front repair line portion with a scanning connection line. The scope of the invention is defined not by the specific embodiments described above, but by the appended claims.

The invention claimed is:

1. An array substrate of a liquid crystal display, comprising:
a first signal line comprising a front portion, a display region portion and an end portion;
a second signal line configured to cross with the first signal line; and
a repair line positioned outside a display region of the array substrate, the repair line comprising a front repair line portion, an end repair line portion and an intermediate repair line portion electrically connecting the front repair line portion and the end repair line portion, the end repair line portion comprising a portion which is electrically isolated from the end portion of the first signal line when the repair line has not been used to repair a defect in the first signal line and is electrically connected with the end portion of the first signal line when the repair line is used to repair a defect in the first signal line,
wherein the front repair line portion comprises a first signal connection line and an external line, the first signal connection line configured to be electrically isolated from the front portion of the first signal line when the repair line has not been used to repair a defect in the first signal line and to be electrically connected with the front portion of the first signal line when the repair line is used to repair a defect in the first signal line, the external line being a portion that is electrically connected with the intermediate repair line portion, and the first signal connection line being electrically isolated from the external line when the repair line has not been used to repair a defect in the first signal line, and wherein the intermediate repair line portion and the end repair line portion at least each comprises a disconnection portion.

2. The array substrate according to claim 1, wherein the front repair line portion further comprises a conductive connection portion, a portion of which overlaps the first signal connection line at least partially and another portion of which overlaps the external line at least partially, the conductive connection portion being insulated from the first signal connection line and the external line.

3. The array substrate according to claim 1, wherein the first signal connection line and the external line at least partially overlap.

4. The array substrate according to claim 1, wherein the first signal line is a data line, and the second signal line is a scanning line.

5. The array substrate according to claim 1, wherein the first signal line is a scanning line, and the second signal line is a data line.

6. A liquid crystal display comprising an array substrate, the array substrate comprising:
- a first signal line comprising a front portion, a display region portion and an end portion;
- a second signal line configured to cross with the first signal line; and
- a repair line positioned outside a display region of the array substrate, the repair line comprising a front repair line portion, an end repair line portion and an intermediate repair line portion electrically connecting the front repair line portion and the end repair line portion, the end repair line portion comprising a portion which is electrically isolated from the end portion of the first signal line when the repair line has not been used to repair a defect in the first signal line and is electrically connected with the end portion of the first signal line when the repair line is used to repair a defect in the first signal line, wherein the front repair line portion comprises a first signal connection line and an external line, the first signal connection line configured to be electrically isolated from the front portion of the first signal line when the repair line has not been used to repair a defect in the first signal line and to be electrically connected with the front portion of the first signal line when the repair line is used to repair a defect in the first signal line, the external line being a portion that is electrically connected with the intermediate repair line portion, and the first signal connection line being electrically isolated from the external line when the repair line has not been used to repair a defect in the first signal line, and wherein the intermediate repair line portion and the end repair line portion at least each comprises a disconnection portion.

7. The liquid crystal display according to claim 6, further comprising a printed circuit board, wherein the intermediate repair line portion is provided on the printed circuit board.

8. The liquid crystal display according to claim 6, wherein the front repair line portion further comprises a conductive connection portion, a portion of which overlaps the first signal connection line at least partially and another portion of which overlaps the external line at least partially, the conductive connection portion being insulated from the first signal connection line and the external line.

9. The liquid crystal display according to claim 6, wherein the first signal connection line and the external line at least partially overlap.

10. The liquid crystal display according to claim 6, wherein the first signal line is a data line, and the second signal line is a scanning line.

11. The liquid crystal display according to claim 6, wherein the first signal line is a scanning line, and the second signal line is a data line.

* * * * *